United States Patent
Myers et al.

(10) Patent No.: US 7,158,841 B1
(45) Date of Patent: Jan. 2, 2007

(54) ACTIVE DC OUTPUT CONTROL AND METHOD FOR CONTROLLING TARGETED APPLICATIONS

(75) Inventors: Theodore M. Myers, Los Altos, CA (US); Kenneth C. Adkins, Fremont, CA (US); John A. Tabler, San Jose, CA (US); Anurag Kaplish, Mountain View, CA (US); Thomas J. O'Brien, Campbell, CA (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 282 days.

(21) Appl. No.: 10/831,508

(22) Filed: Apr. 23, 2004

(51) Int. Cl.
  *G05B 13/02* (2006.01)
(52) U.S. Cl. .......................... 700/28; 700/31
(58) Field of Classification Search ................ 700/28, 700/31, 35, 37, 71, 11, 276, 290
  See application file for complete search history.

(56) References Cited

U.S. PATENT DOCUMENTS

| | | | | |
|---|---|---|---|---|
| 5,036,295 A | * | 7/1991 | Kamitani | 331/10 |
| 5,396,642 A | * | 3/1995 | Blais et al. | 455/1 |
| 5,467,607 A | | 11/1995 | Harvey | |
| 5,495,282 A | * | 2/1996 | Mostafa et al. | 725/21 |
| 5,926,515 A | * | 7/1999 | Park | 375/376 |
| 6,031,660 A | | 2/2000 | Park | |
| 6,091,303 A | * | 7/2000 | Dent | 331/2 |
| 2003/0153986 A1 | | 8/2003 | Salsbury | |

* cited by examiner

*Primary Examiner*—Thomas Pham
(74) *Attorney, Agent, or Firm*—Fernandez & Associates, LLP

(57) ABSTRACT

A feedback control-loop system that employs an active DC output control circuit is disclosed which compares an input parameter measurement against a target specification associated with the input parameter measurement. In one embodiment, the active DC output control circuit receives an input signal for laser bias adjustment. In another embodiment, the active DC output control circuit receives a motor speed input from a source, such as a tachometer, for motor speed adjustment. In another embodiment, the active DC output control circuit receives an input power amplifier measurement for wireless applications.

36 Claims, 10 Drawing Sheets

ACTIVE DC OUTPUT CONTROL AND METHOD FOR CONTROLLING TARGETED APPLICATIONS

CROSS REFERENCE TO RELATED APPLICATIONS

This application relates to a co-pending U.S. patent application Ser. No. 10/294,842 filed on Nov. 13, 2002, entitled "Active DC Output Control and Method for DC/DC Converter" by Myers et al., owned by the assignee of this application and incorporated herein by reference.

BACKGROUND INFORMATION

1. Field of the Invention

The invention relates generally to integrated circuit design, and more particularly to an integrated circuit for generating a voltage signal used to control a parameter of an application being monitored.

2. Description of Related Art

Most systems today using feedback control based on sensing a parameter of the system to be controlled require a microprocessor and other expensive components to accomplish the desired goal. Systems such as those described in U.S. Pat. No. 5,467,607, U.S. 2003/0153986 and U.S. Pat. No. 6,031,660 are examples of feedback control systems which the current invention could replace or at the very least simplify.

Accordingly, it is desirable to have a device and method for inexpensively controlling a parameter of an application while sensing an analog voltage signal characteristic of the being controlled parameter.

SUMMARY OF THE INVENTION

The present invention provides a feedback control-loop system that employs an active DC output control circuit which compares an input parameter measurement against a target specification associated with the input parameter measurement. In one embodiment, the active DC output control circuit controls a temperature for laser bias adjustment. In another embodiment, the active DC output control circuit controls a motor speed input from a source, such as a tachometer, for motor speed adjustment. In a third embodiment, the active DC output control circuit controls a power amplifier for wireless applications. Other applications are possible as one knowledgeable in the art will understand and as mentioned in the prior art.

A system-on-a-chip comprises a digital-to-analog converter for receiving an analog input parameter signal, the digital-to-analog converter scaling the analog signal by a factor stored on the chip; a buffer for buffering the signal from the DAC and a filter coupled to the output of the buffer for filtering the buffered, scaled analog signal to produce a filtered, buffered, scaled signal; a comparator having a first input for receiving a target specification associated with the input parameter measurement and having a second input for receiving the filtered, buffered, scaled signal, the comparator comparing the target specification with the filtered, buffered, scaled signal; and a logic circuit for increasing the output signal if the value of the filtered signal is less than the input parameter and for decreasing the output signal if the value of the filtered signal is greater than the input parameter for a positive polarity case. The filtered signal is increased or decreased by the ADOC™, active DC output control circuit, adjusting its control voltage output, (113 of FIG. 1) to the input trim pin (121 of FIG. 1) of the application being controlled, thus producing a change in the signal parameter being sensed by the ADOC™.

Advantageously, in an alternative embodiment, the present invention enables a system to achieve a desired parameter at the output load within a narrow voltage margin of a DC/DC converter array. A non-volatile memory in the active DC output control circuit stores multiple values of desired output voltages including nominal and test values for the array loads, including scaling factors and shifting levels and polarities.

This summary does not purport to define the invention. The invention is defined by the claims. One knowledgeable in the art will be able to perceive numerous applications for the invention.

DETAILED DESCRIPTION OF PREFERRED EMBODIMENTS

Figure 1:
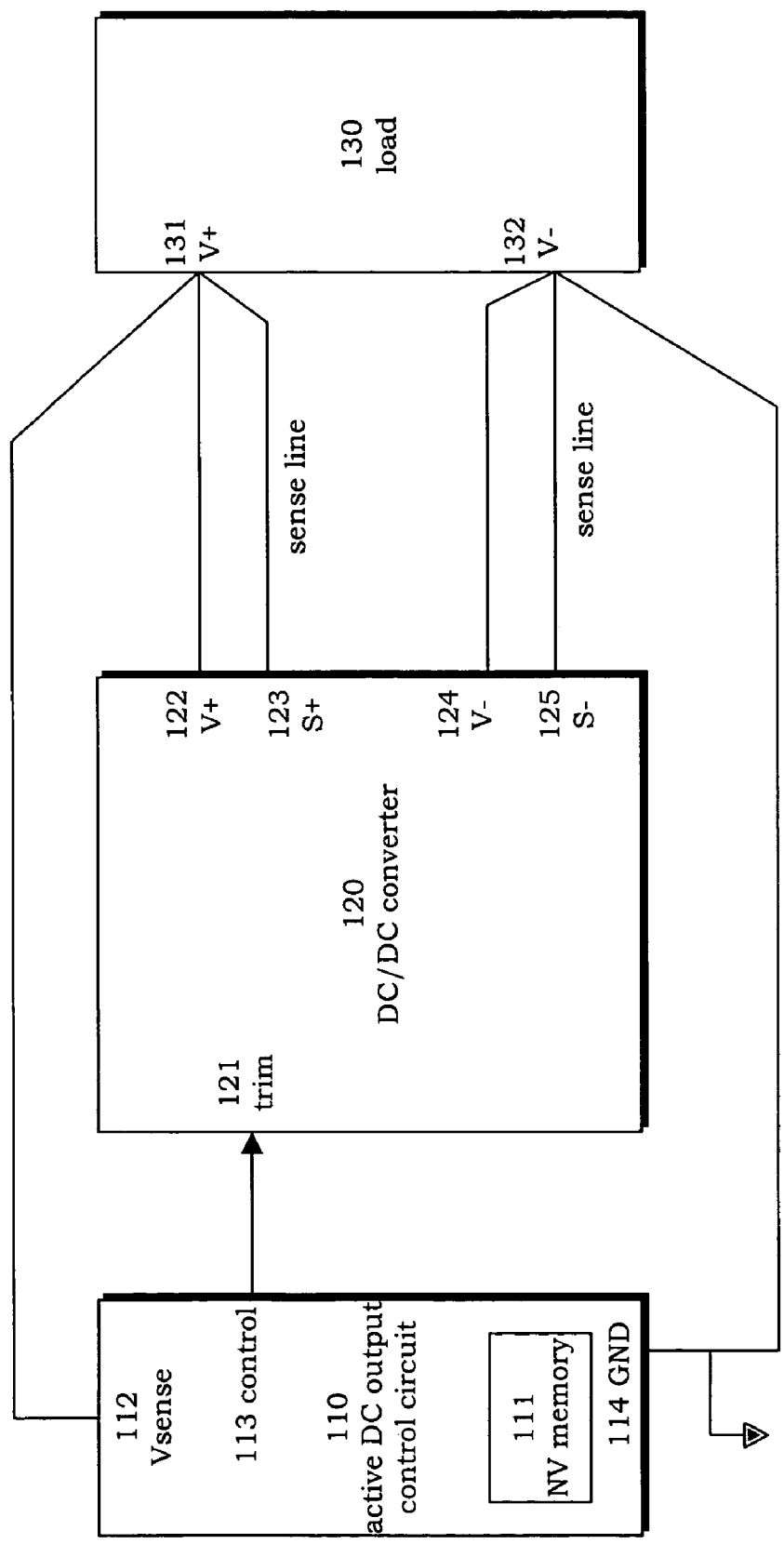
FIG. 1 is an architectural diagram illustrating a first embodiment of a control loop system that employs an active DC output control for a single load, in this case a DC/DC converter, in accordance with the present invention.

Referring now to FIG. 1, there is shown an architectural diagram illustrating a first embodiment of a control loop system plus application 100 with an active DC output control for a single load. The control loop system plus application 100 comprises an active DC output control circuit 110 having a NV (non-volatile) memory 111, which in turn is connected to a DC/DC converter 120, which in turn is connected to a single port load 130, collectively (120+

130), the application. A control pin 113 from the active DC output control circuit 110 is connected to an input trim pin 121 of the DC/DC converter 120. At a V+ input 131 of the load 130, the V+ input 131 is commonly connected to a Vsense 112 of the active DC output control circuit 110, a V+ 122 of the DC/DC converter 120, and a S+123 of the DC/DC converter 120. At a V− input 132 of the load 130, the V− input 132 is commonly connected to a ground 114 of the active DC output control circuit 110, a V− 124 of the DC/DC converter 120, and a S− 125 of the DC/DC converter 120. An objective of the active DC output control circuit 110 is to precisely regulate the voltage difference between V+ 131 and V− 132 at the load 130. One of ordinary skill in the art should recognize that the load 130 can be either a single load or multiple loads, which is shown and further described with respect to FIG. 2.

Figure 2:
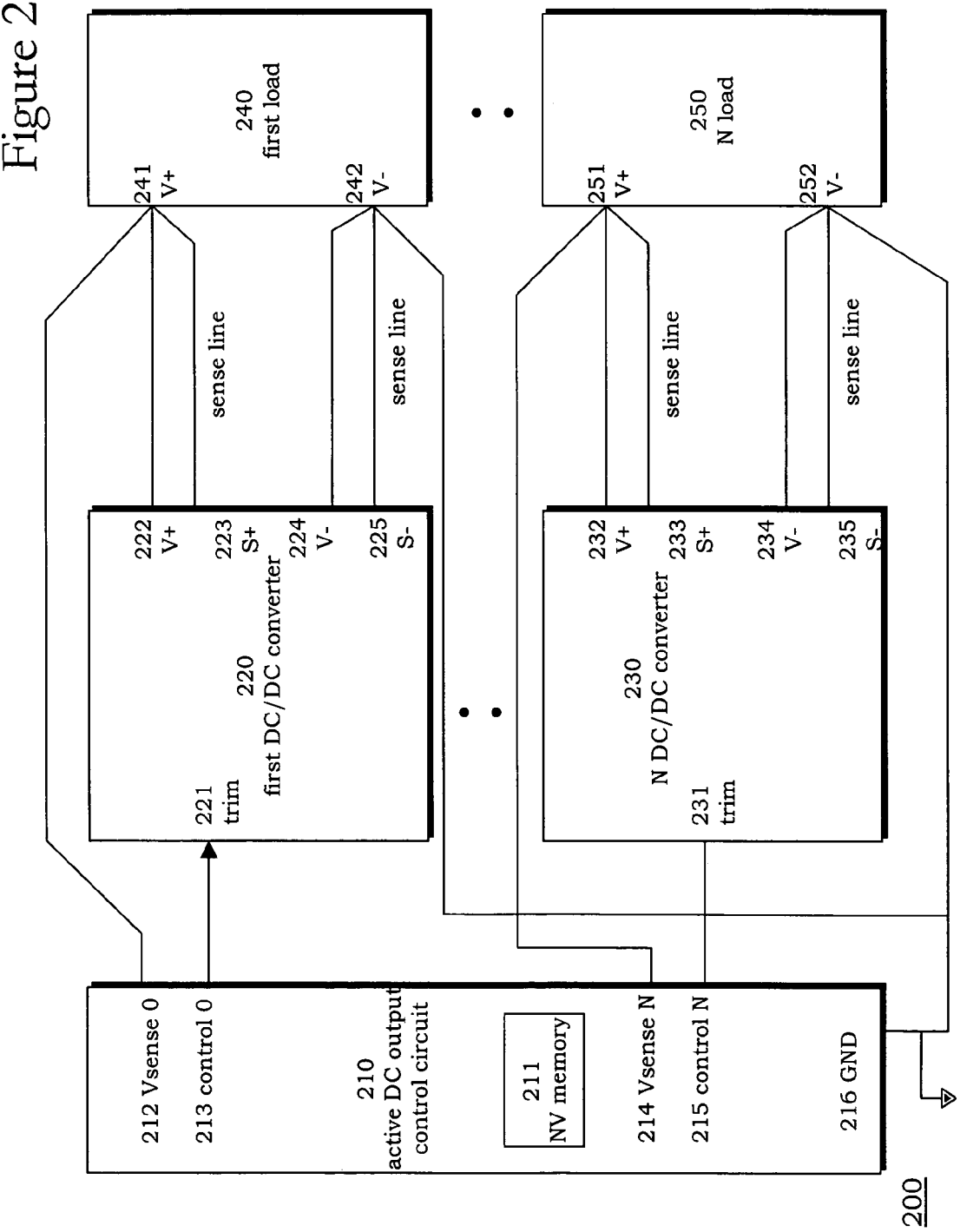
FIG. 2 is an architectural diagram illustrating a second embodiment of a control loop system that employs an active DC output control for multiple loads in accordance with the present invention.

Turning now to FIG. 2, there is shown an architectural diagram illustrating a second embodiment of a control loop system 200 that employs an active DC output control for multiple port loads. The control loop system 200 comprises an active DC output control circuit 210 having a NV memory 211 and having multiple trim pins: a control pin 0 (213) through a control pin N (215). The control pin 0 (213) from the active DC output control circuit 210 is connected to a trim pin 221 of a first DC/DC converter 220, which in turn has a set of V+ 222 and S+ 223 pins that are connected to a V+ 241 pin in a first load 240, and a set of V− 224 and S− 225 coupled to a V− 242 pin in the first load 240. The control pin N (215) from the active DC output control circuit 210 is coupled to a trim pin 231 in Nth DC/DC converter 230, which in turn has a set of V+ 232 and S+ 233 pins connected to a V+ 251 pin of Nth load 250, and a set of V− 234 and S− 235 connected to a V− 252 pin in the Nth load 250. As shown in FIG. 2, additional DC/DC converters are positioned between the first DC/DC converter 220 and the Nth DC/DC converter 230, as well as additional loads are positioned between the first load 240 and the Nth load 250. The active DC output control circuit 210 has a Vsense 0 (212) coupled to the V+ 241 of the first load 240, a Vsense N (214) coupled to the V+ 251 of the N load 250, and a ground 216 coupled commonly to the first load 240 through the Nth load 250. The active DC output control circuit 210 uses the control 0 pin (213) to precisely regulate the V+ 241 input at the first load 240, and uses the control Nth pin 213 to precisely regulate the V+ 251 input at the Nth load 250. Additional trim pins in the active DC output control circuit 210 are positioned to precisely regulate additional DC/DC converters and loads as schematically shown.

For example, if the control loop system plus applications 200 contains a 3.3V DC/DC converter in the first DC/DC converter 220 and a 2.5V DC/DC converter in the Nth DC/DC converter 230, the user may need to test all load components with those supplies raised by 5%. The active DC output control circuit 210 measures the voltage output V+ 241 generated from the 3.3V DC/DC converter 220, compared with a first reference voltage, and adjusts the voltage output slightly upward by adjusting the voltage on the control pin 0 (213). The active DC output control circuit 210 then switches to the next DC/DC Converter which has been programmed into the non-volatile memory (211) of active DC output control circuit 210 through a serial interface line (not shown) and read by the control logic (320). Any combination of the first through Nth DC/DC converters may be programmed to be controlled or bypassed. Eventually the sequence will step to the 2.5V DC/DC converter in the Nth DC/DC converter (230) position and perform the same operation or skip as the pre-programmed instructions indicate. This process is repeated until all selected supplies are at the desired output levels of nominal plus 5%. The active DC output control circuit 210 then maintains the desired output level. If the voltage output V+ 241 drifts higher or lower, the active DC output control circuit 210 senses the change and makes slight adjustments to the trim pin until the output is back at the set point. When testing is completed, the active DC output control circuit 210 can be disconnected to allow the DC/DC converter to return to its nominal output. Alternatively, the active DC output control circuit 210 can be re-programmed to the desired nominal output values for the converters and left connected to the trim pins. This can provide a more accurate DC output level than the converters would normally provide.

Figure 3A:
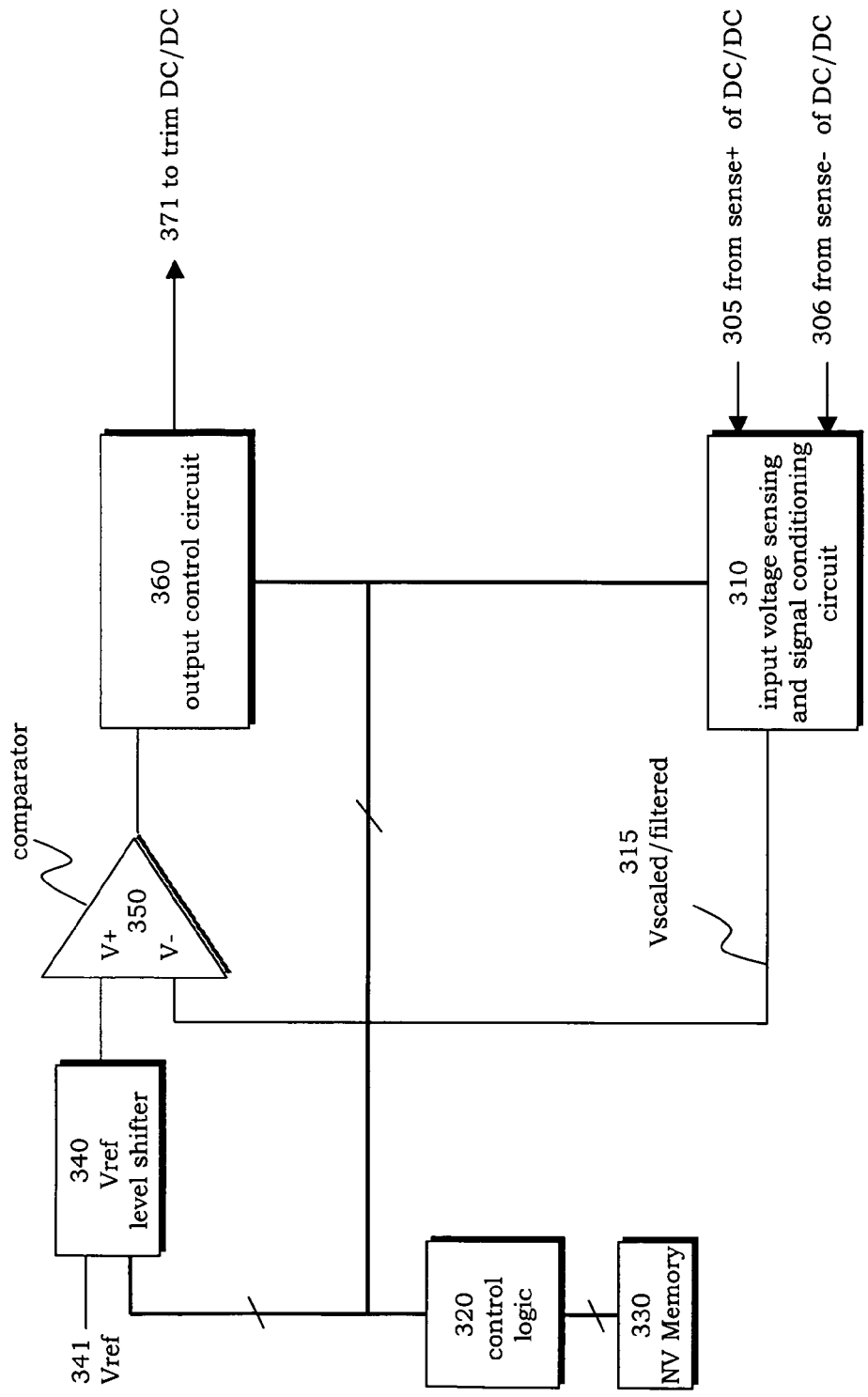
FIG. 3A is more detailed block diagram illustrating the control loop system 300 with an active DC output control for a single load in accordance with the present invention.
Figure 3B:
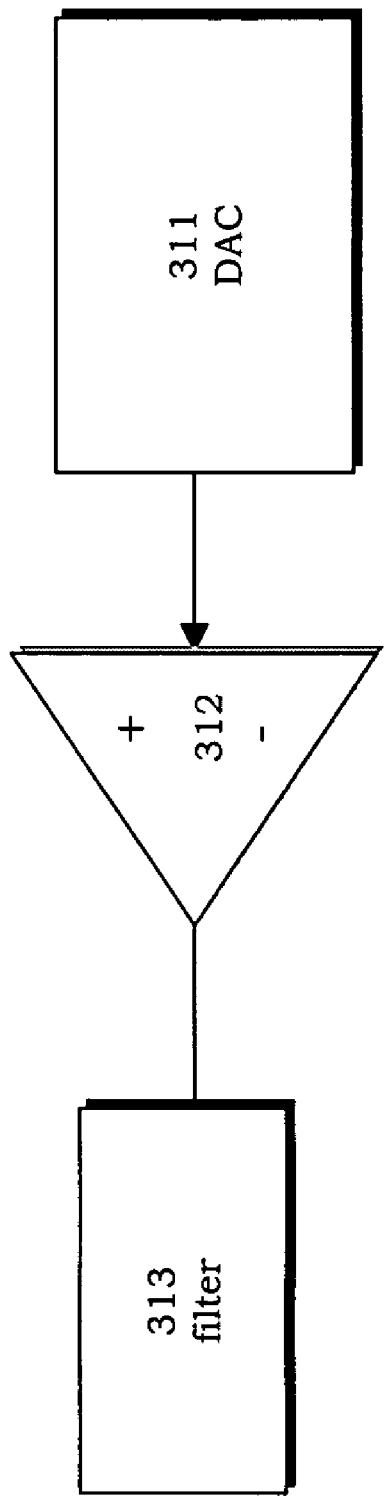
FIG. 3B is a circuit diagram of the input voltage sensing and signal conditioning circuit in accordance with one embodiment of the present invention.

FIG. 3A is a more detailed block diagram 300 illustrating the active DC output control circuit 110 for a single application. An input voltage sensing and signal conditioning circuit 310 comprises a digital-analog-converter DAC circuit 311, coupled to a unity gain amplifier 312, functioning as the buffer, and a filter 313, as shown in FIG. 3B. The input voltage sensing and signal conditioning circuit (310) receives a sense+ signal (305) and a sense− signal 306 into the DAC 311. The sense− signal is typically a common ground as noted in FIG. 2 (216). DAC (311) scales the analog signal (305) by a digital factor received from the control logic (320) and stored in NV Memory (330). In one example, for a 10 bit DAC, the analog sense signal would be divided by 1024, equivalent to 10 bits, and then multiplied by the scaling factor, for instance 512 if a 50% scaling had been chosen. Similarly, if the DAC were eight bits, 256 would be the divisor and a scaling from 0/256 to 255/256 could be achieved. Next, the now scaled signal passes to the unity gain amplifier (312) and then through the filter (313). The input voltage sensing and signal conditioning circuit 310 generates a scaled/buffered/filtered ($V_{s/b/f}$) signal (315) to a comparator (350). The comparator (350) compares the scaled/buffered/filtered ($V_{s/b/f}$) signal (315) with a reference ($V_{ref}$) signal (341) that propagates through a Vref level shifter (340) into the comparator (350). The level shifter quantity is determined by instructions from the control logic unit (320) which reads the $V_{ref}$ shift value stored in NV Memory (330)

If the application, such as the DC/DC converter (120), is assigned a positive polarity and the $V_{ref}$ (341) signal, after level shifting, is greater than the $V_{s/b/f}$ signal (315), the output control circuit (360) adjusts the voltage on the ADOC™ control pin (371), or (113), slightly upward to increase the trim voltage (121) and subsequently V+ (122). If the application, such as the DC/DC converter (120), is assigned a positive polarity and the $V_{ref}$ (341) signal, after level shifting, is less than the $V_{s/b/f}$ signal 315, the output control circuit (360) adjusts the voltage on the ADOC™ control pin (371), or (113), slightly lower to decrease the trim voltage (121) and subsequently lower V+ (122).

If the application, such as the DC/DC converter (120), is assigned a negative polarity and the $V_{ref}$ (341) signal, after level shifting, is greater than the $V_{s/b/f}$ signal (315), the output control circuit (360) adjusts the voltage on ADOC™ control pin (371), or (113), slightly downward to decrease the trim voltage (121) and subsequently increase V+ (122).

If the application, such as the DC/DC converter (120), is assigned a negative polarity and the $V_{ref}$ (341) signal, after level shifting, is less than the $V_{s/b/f}$ signal (315), the output control circuit (360) adjusts the voltage on ADOC™ control pin (371), or (113), slightly upward to increase the trim voltage (121) and subsequently decrease V+ (122). $V_{ref}$ (341) is supplied from a source internal to the ADOC™ chip (not shown) or, alternatively, by the user; typical values are in the 1.25 volt range but higher or lower may be used depending upon the application.

The assignment of positive or negative polarity is done by the user based on the particular application and stored in NV Memory (330) as a 0 or 1 bit, typically. This information is then used by control logic (320) to determine the polarity for adjusting output control circuit (360).

Figure 7:
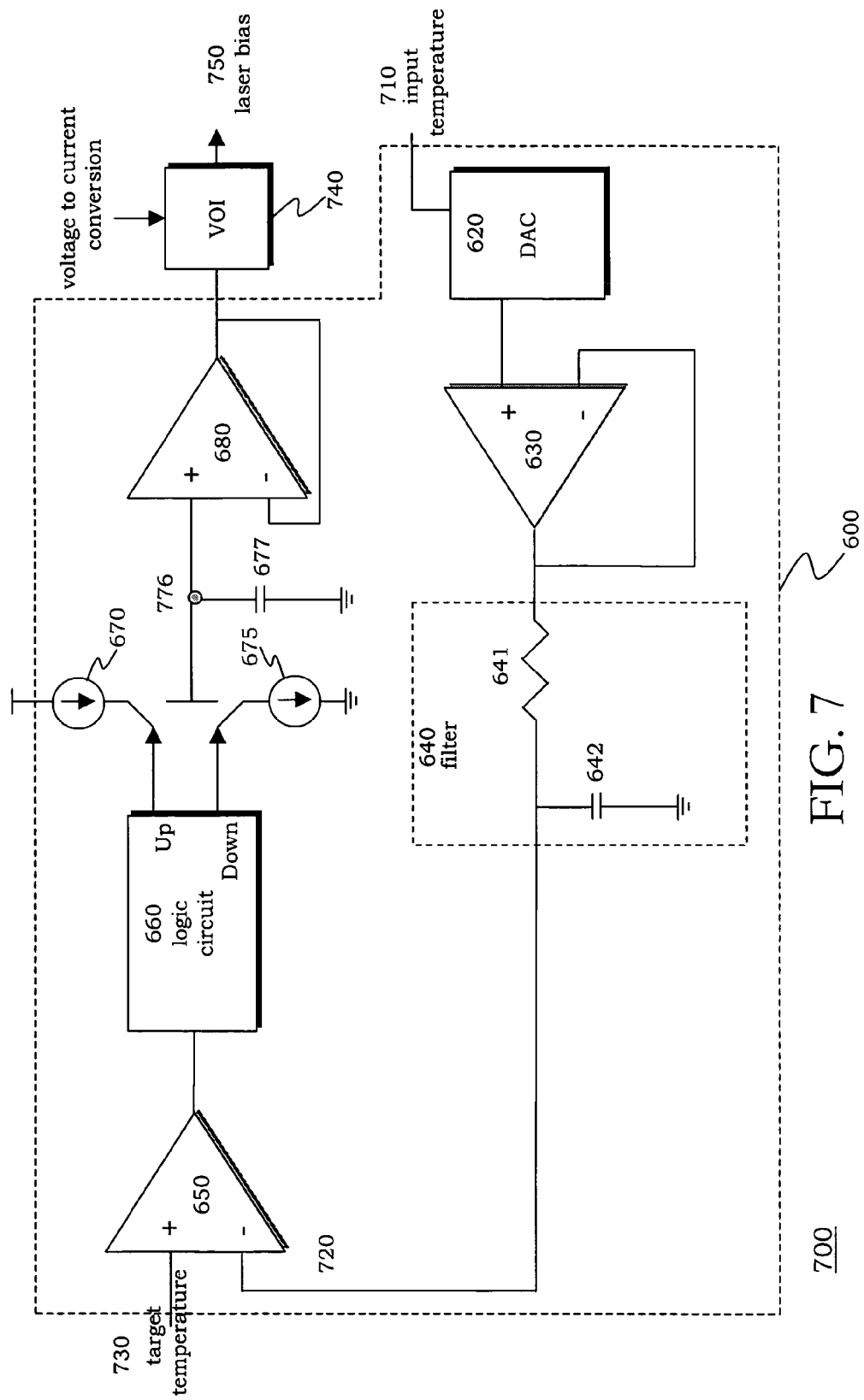
FIG. 7 is an architectural diagram illustrating an embodiment for implementing the active DC output controller for laser bias adjustment in accordance with the present invention.

Control logic (320) allows the user to interface with the application, in this case a DC/DC converter (120). In addition, the control logic (320) controls the digital scaling data going to the DAC (311) and the Vref level shifter (340). Furthermore, the control logic (320) controls the sequence of events that occurs in the active DC output control circuit (110). The control logic (320) is coupled to NV Memory (330) that stores the data for the DAC (311) and Vref level shifter (340). The output signal (371) generated by the output control circuit (360) can be either a voltage signal or current signal as previously programmed into the control logic 320. Conversion to current requires the addition of a "voltage-to-current" conversion capability either externally as shown in FIG. 7 (VOI-740) or internally on the ADOC™ chip itself (not shown).

A scaling higher than 1 can be achieved, if desired, by adjusting the reference voltage such that a higher output than a normal 100% full scale might be achieved. For instance, on a DC/DC converter application, if a Vsense (305) coming in is indicating the converter is at its rated 5 volt output and, for purposes of this example, the scaling is set to 50%, the ($V_{s/b/f}$) signal (315) sent to the comparator (350) will be 2.5 volts. If the Vref chosen to correspond to a 5 volt output is also 2.5 volts and the level shifter is set to 1.0, then no adjustment will occur by the output control circuit (360). However, if Vref is increased by 5% to 2.625 volts, then the output control circuit (360) will increase the trim voltage until 5.25 volts is on the sense line (305) and the ($V_{s/b/f}$) signal (315) sent to the comparator (350) will be 2.625 volts.

Figure 4:
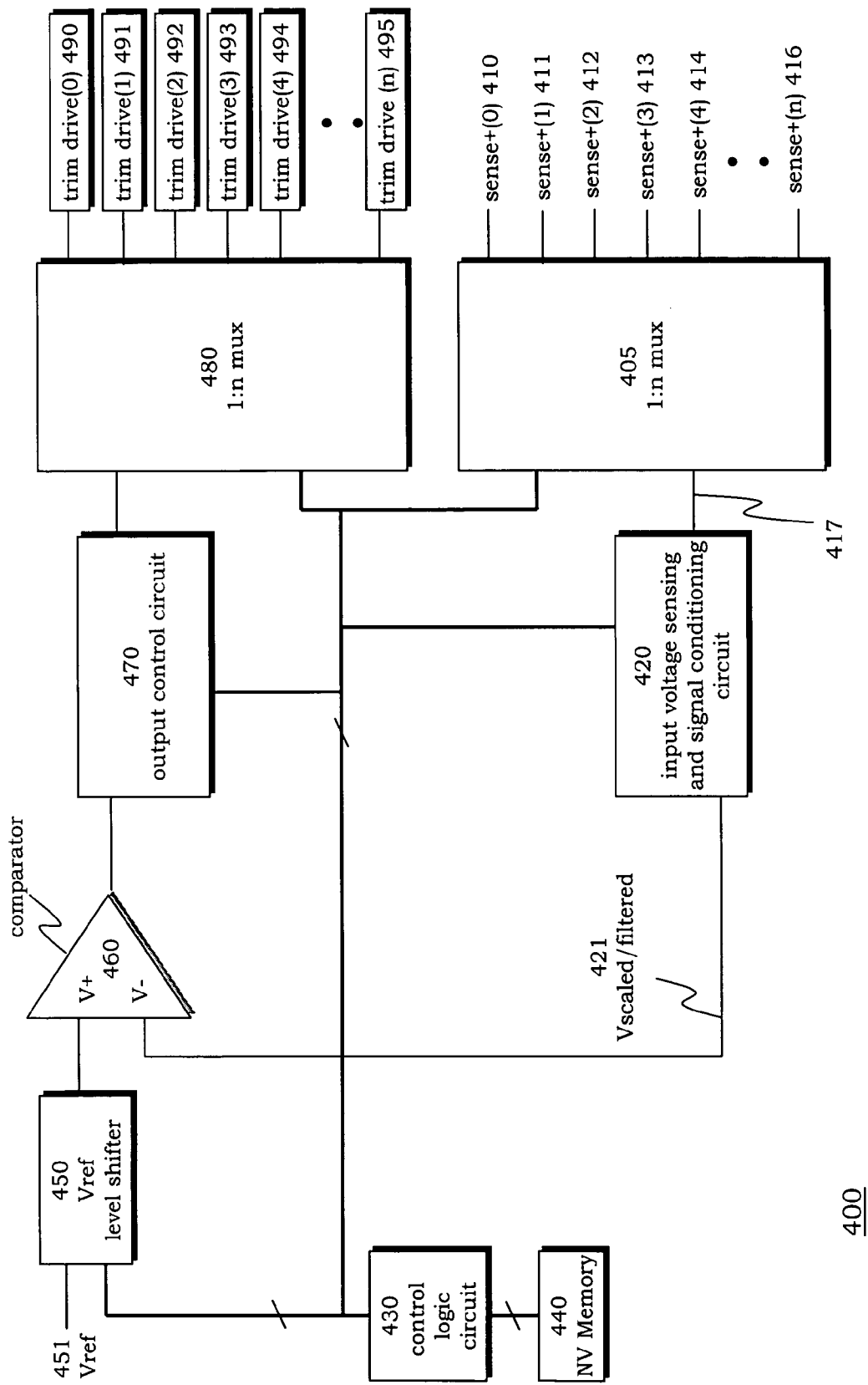
FIG. 4 is a more detailed block diagram illustrating the control loop system 400 with an active DC output control for multiple loads in accordance with the present invention.

FIG. 4 is a more detailed block diagram (400) illustrating the active DC output control circuit 210 with an active DC output control for multiple applications. A n:1 mux (405) multiplexes multiple sense signals ranging from a sense+(0) (410) signal, a sense+(1) (411) signal, up to a sense+(n) (416) signal into an input voltage sensing and signal conditioning circuit (420). (n) may be as large as practical, for instance 6 or 256 or higher. The input voltage sensing and signal conditioning circuit (420) comprises the digital-to-analog converter DAC circuit (311), coupled to the unity gain amplifier, or buffer, (312) and the filter (313), as shown in FIG. 3B. The n:1 mux (405) transmits an output signal (417) from a selected signal among the sense+(0) (410) signal, the sense+(1) (411) signal, up to and including the sense+(n) (416) to the input voltage sensing and signal conditioning circuit (420); the selection is based upon instructions from the control logic circuit (430) as previously programmed and stored in NV Memory (440). The input voltage sensing and signal conditioning circuit (420) processes the signal (417) through the DAC (311), the unity gain amplifier (312), the filter (313), and generates a scaled/buffered/filtered ($V_{s/b/f}$) signal (421). A comparator (460) receives the scaled/buffered/filtered signal (421) from the input voltage sensing and signal conditioning circuit (420) and compares with a reference, $V_{ref}$, signal (451) after it propagates through a Vref level shifter (450). All relationships for multiple applications are analogous to the description for single application operation described previously. Control logic (430) has a serial interface input (not shown) over which the user programs the sequence of starting or stopping the activity for each application and turning a particular application "on" or "off"; this information is also stored in NV Memory (440) and may be updated in real time in one embodiment. All data stored in the NV Memory (440) is transmitted via the serial port of the control logic portion. Other communication methods than a serial interface are feasible as one knowledgeable in the field is aware. Note that in the multiple application case the Sense– signal is taken to be a common ground (not shown); an additional n:1 multiplexer is not required for that signal.

An output control circuit (470) is connected to the comparator (460) for increasing or decreasing the voltage output using the results of the comparator (460) and the polarity of a given application as stored in NV Memory (440) and transmitted by control logic circuit (430). A 1:n mux (480) selects the appropriate trim drive among a trim drive(0) (490), up to a trim drive(n) (495).

Figure 5:
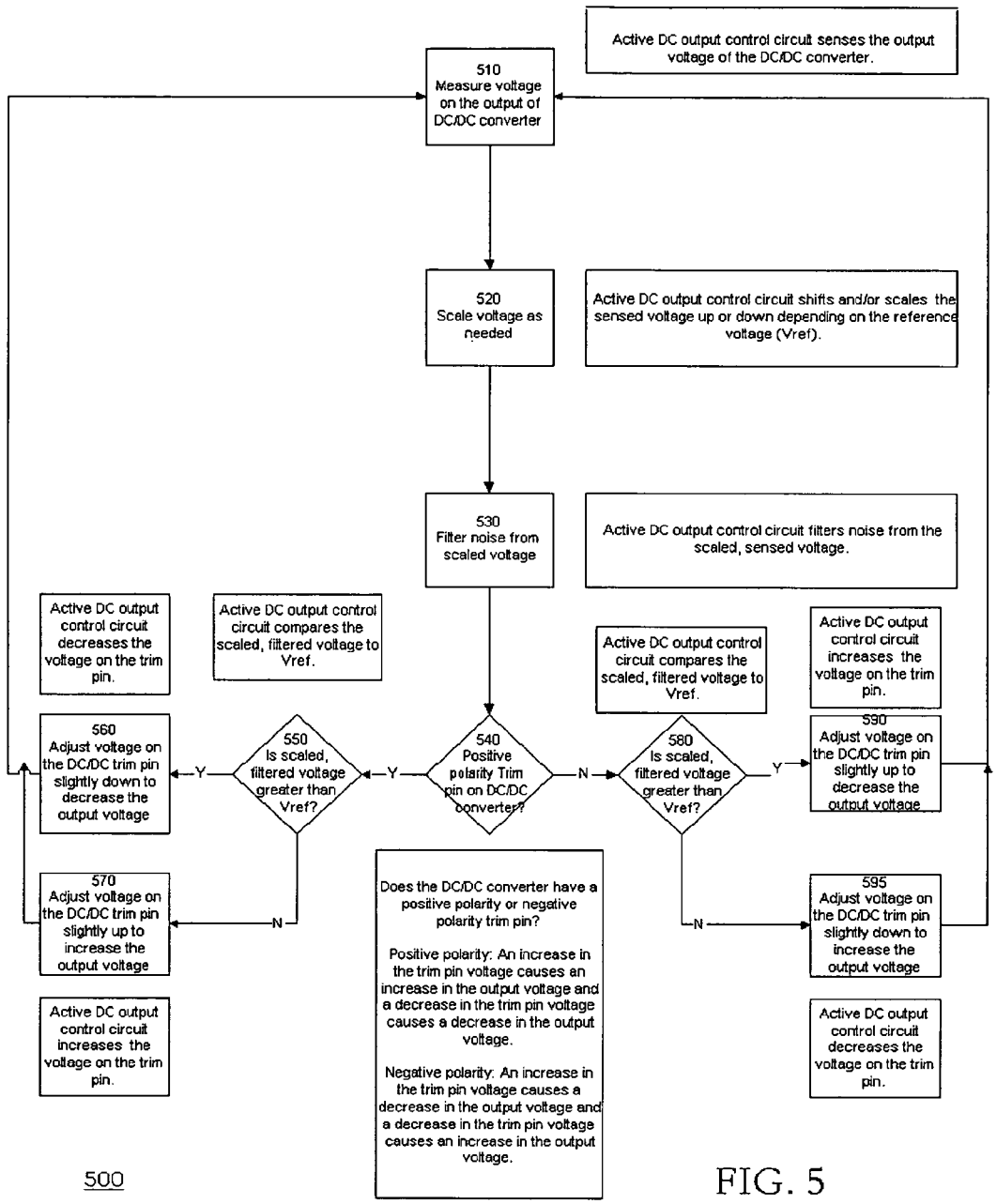
FIG. 5 is a flow diagram illustrating the process for monitoring an active DC output control loop in accordance with one embodiment of the present invention using a DC/DC converter as the target application.

FIG. 5 is a flow diagram (500) illustrating the process for actively controlling the DC output of given application, in this case a DC/DC converter. At step 540, the active DC output control circuit (110), (210) or (400) will react depending on whether the application, in this case a DC/DC converter, has a positive polarity or a negative polarity. FIG. 5 shows the logical steps of the ADOC™ as described previously.

Figure 6:
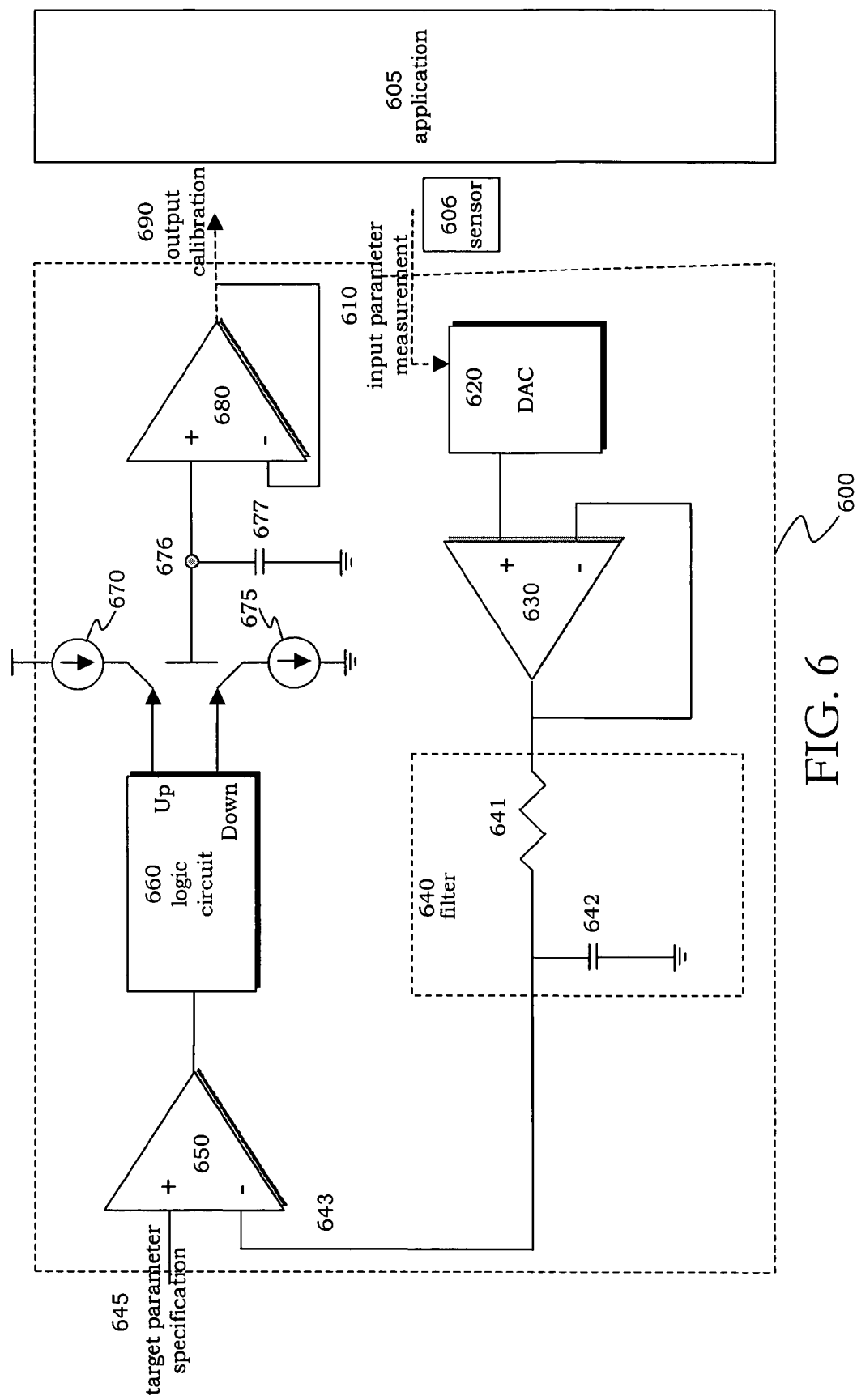
FIG. 6 is a general architectural diagram illustrating an active DC output controller for monitoring, adjusting, and maintaining a specific input parameter from an application in accordance with an embodiment of the present invention.

Referring now to FIG. 6, there is shown a general architectural diagram illustrating an alternative active DC output controller (600) for monitoring, adjusting, and maintaining a specific input parameter from an application (605) with a feedback control-loop that generates an output signal (690) for adjustment to the specific application (605) in accordance with an embodiment of the present invention. Certain elements of the basic ADOC™ circuit as shown in FIG. 3A have been omitted and certain other elements have been expanded for clarifying purposes. The active DC output control (600) comprises a DAC, digital-to-analog converter, 620, a buffer 630, a filter 640, a comparator 650, a logic circuit 660, a first current source 670, a second current source 675, a capacitor 677, and a buffer 680. The DAC 620 receives an input parameter measurement signal 610 from a source, such as a sensor 606 or, alternatively, directly from the application 605. The DAC 620 scales the input parameter measurement signal 610, the buffer 630 buffers the input parameter measurement signal 610, and the filter 640 filters the input parameter measurement signal 610. In one embodiment, the filter 640 comprises a resistor having a first end connected to an output of the buffer 630, a second end connected commonly to a capacitor 642, and a negative input of the comparator 650. The comparator 650 compares the filtered, buffered, scaled input parameter measurement signal 643 received through the negative input of the comparator 650 with a target parameter specification 645 received through a positive input of the comparator 650. Depending on whether the target parameter specification 645 is higher or lower than the filtered input parameter measurement 643, the logic circuit 660 increases the voltage on node 676 if the filtered input parameter measurement 643 is lower than the target parameter specification 645, and decreases the voltage on node 676 if the filtered input parameter measurement 643 is higher than the target parameter specification 645; the changes on node 676 are reflected in similar action by the input parameter measurement 643. The logic circuit 660 in turn increases the voltage at a node 676 if the adjustment is to increase an output control signal 690 or decreases the voltage at the node 676 if the adjustment is to decrease the output control signal 690. The buffer 680 buffers the output received from the logic circuit 660 before generating the output calibration signal 690. This sequence of actions is for a positive polarity application.

The general architecture of the active DC output controller 600 can be applied to various applications for sensing a parameter, such as a temperature, a motor speed, a power amplifier level, where a feedback control-loop compares an input parameter measurement signal with a reference signal for a specific application for adjusting an output control signal to meet the target parameter specification associated with the input parameter measurement signal.

In FIG. 7, there is shown an architectural diagram 700 illustrating one embodiment for implementing the active DC output controller, ADOC™, (110), (210), (300), (400), for laser bias adjustment in accordance with the present invention. In this embodiment, the partial active DC output control schematic as shown in FIG. 6 (600) is coupled to a voltage to current converter (VOI) 740. An objective of the laser bias architecture 700 is to adjust a laser bias by increasing or decreasing an electrical voltage, or alternatively a current, traveling through the active DC output controller 600 for controlling and maintaining a target laser temperature.

An input temperature signal 710 is generated to the DAC 620 from a source such as a temperature sensor (not shown). The DAC 620 scales the input temperature signal 710, the buffer 630 buffers the scaled temperature signal 710, and the filter 640 filters the buffered temperature signal 710. The comparator 650 compares the filtered, buffered, scaled temperature signal 720 with a target temperature signal 730 associated with the input temperature measurement signal 710 from its designated application, in this case a specific laser. Depending on whether the target temperature 730 is higher or lower than the filtered, buffered, scaled input temperature signal 720, the logic circuit 660 increases the voltage at the node 776 if the adjustment is to increase a laser bias signal 750, or decreases the voltage at the node 776 if the adjustment is to decrease the laser bias signal 750. The buffer 680 buffers the output received from the logic circuit 660 and generates a voltage signal to the VOI 740. The VOI 740 converts the voltage signal received from the buffer 680 to a current signal before producing the laser bias signal output 750. This description assumes a positive polarity for this application.

Figure 8:
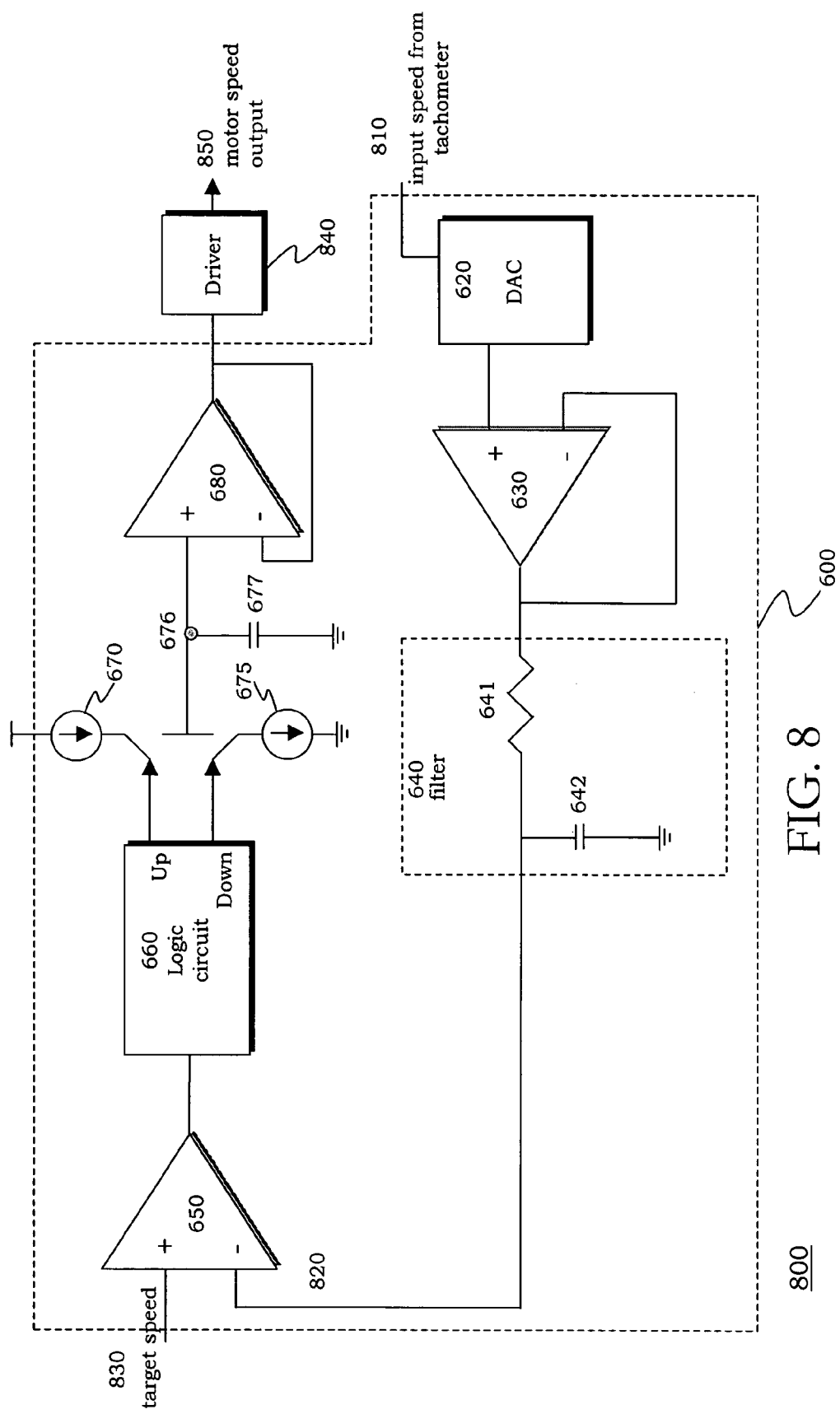
FIG. 8 is an architectural diagram illustrating an embodiment for implementing the active DC output controller for motor speed adjustment in accordance with the present invention.

FIG. 8 is an architectural diagram 800 illustrating an alternative embodiment for implementing the active DC output controller, ADOC™, (110), (210), (300), (400), for motor speed adjustment in accordance with the present invention. In this embodiment, the partial active DC output control schematic as shown in FIG. 6 (600) is coupled to a driver 840. An objective of the motor speed control architecture 800 is to adjust the speed of a motor driven apparatus by increasing or decreasing an electrical voltage or current traveling through the active DC output controller 600 for calibrating and maintaining a desired speed.

An input speed signal 810 is generated to the DAC 620 from a source such as a tachometer or other speed sensor. The DAC 620 scales the input speed signal 810, the buffer 630 buffers the scaled input speed signal, and the filter 640 filters the buffered, scaled, input speed signal. The comparator 650 compares the signal filtered, buffered, scaled, input speed signal 820 with a target speed signal 830 associated with the application generating input speed signal 810. Depending on whether the target speed signal 830 is higher or lower than the processed speed signal 820, the logic circuit 660 in turn increases the voltage at the node 676 if the adjustment is to increase a motor speed output 850, or decreases the voltage at the node 676 if the adjustment is to decrease the motor speed output 850; these steps are applicable to the positive polarity case. The buffer 680 buffers the output received from the logic circuit 660 and transmits a signal to the driver 840. The driver 840 transmits the motor speed signal output 850 back to the application for adjustment of the motor speed.

Figure 9:
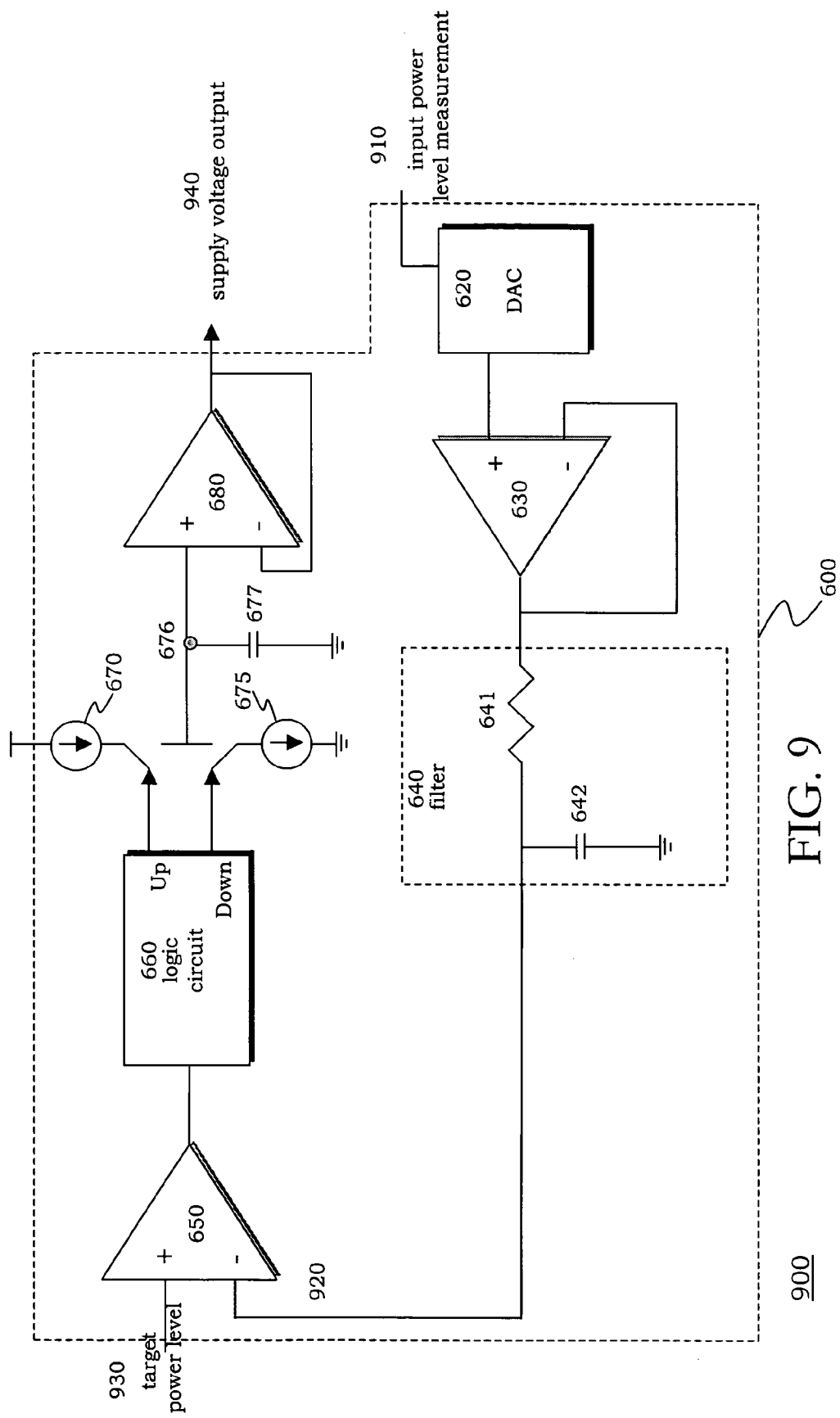
FIG. 9 is an architectural diagram illustrating an embodiment for implementing the active DC output controller for power amplifier adjustment in wireless applications in accordance with the present invention.

FIG. 9 is an architectural diagram illustrating another embodiment for implementing the active DC output controller, ADOC™, (110), (210), (300), (400) for power amplifier adjustment in wireless applications in accordance with the present invention. An objective of the wireless power amplifier control architecture 900 is to vary a supply voltage for controlling power dissipation by increasing or decreasing an electrical voltage traveling from the active DC output controller 600.

An input power level measurement signal 910 from a power amplifier is generated to the DAC 620 from a source such as a base station. The DAC 620 scales the input power level measurement signal 910, the buffer 630 buffers the scaled input power level measurement signal, and the filter 740 filters the buffered, scaled, input power level measurement signal. The comparator 650 compares the processed signal 920 with a target power level 930 associated with the application generating the input power level measurement signal 910. Depending on whether the target power level 930 is higher or lower than the filtered input power level measurement 920, the logic circuit 660 in turn increases the voltage at node 676 if the adjustment is to increase a supply voltage output 940 or decreases the voltage at the node 676 if the adjustment is to decrease the supply voltage output 940. By utilizing the control-loop in the wireless power amplifier control architecture 900, the active DC output controller 600 senses the strength of a power signal received through a sensor, which is indicative of the distance which a wireless device is away from a base station. If the signal is weak, the active DC output controller 600 increases the supply voltage, which in turn will generate more power to the supply voltage output 940 of the power amplifier.

One of ordinary skill in the art should recognize that the use of a sensor to detect the input power level measurement 910 can be either external from the active DC output controller 600, or the sensor can be built-in within the active DC output controller 600.

The above embodiments are only illustrative of the principles of this invention and are not intended to limit the invention to the particular embodiments described. For example, the active DC output controller disclosed above with respect to FIGS. 1 through 9 can be applied to other applications, such as medical devices or building temperature control, in addition to the ones that were described above for adjusting a temperature, a motor speed, a power amplifier, without departing from the spirit of the present invention. Although the term "load" or "loads" is used, one of ordinary skill in the art should recognize that other similar or equivalent terms can be used without departing from the intent of the present invention. Moreover, it is apparent to one skilled in the art that various types of NV memories can be used, such as an $E^2$, FeRam, MagRam or even battery backed-up memory, without departing from the spirit of the present invention. Accordingly, various modifications, adaptations, and combinations of various features of the described embodiments can be practiced without departing from the scope of the invention as set forth in the appended claims.

We claim:

1. A system on a chip, comprising:
a digital-to-analog converter for receiving an analog input parameter signal, the digital-to-analog converter scaling the analog input parameter signal;
a buffer coupled to the digital-to-analog converter for buffering the analog signal to produce a buffered, scaled analog signal;
a filter coupled to the buffer for filtering the analog signal to produce a filtered, buffered, scaled analog signal;
a comparator having a first input for receiving a target specification signal associated with the input parameter signal and having a second input for receiving the filtered, buffered, scaled analog signal;
the comparator comparing the target specification signal with the filtered, buffered, scaled analog signal;
an output control circuit for generating an output signal based upon controlling instructions and the comparator's result;
control logic coupled to the output control circuit and coupled to the digital-to-analog converter for controlling said output control circuit and said digital-to-analog converter;
an interface port connected to said control logic for communicating control data and instructions; and
non-volatile memory coupled to said control logic for storing control data and instructions.

2. The system of claim 1 further comprising reference voltage level shifter coupled
said control logic, reference voltage source and said comparator and generating said target specification signal for the comparator.

3. The system of claim 2, wherein said reference voltage source is provided to reference voltage level shifter from an external means.

4. The system of claim 2, wherein said reference voltage source is provided to reference voltage level shifter from an internal means.

5. The system of claim 1, further comprising a second buffer having an input coupled to said output control circuit and having an output for generating an output control circuit.

6. The system of claim 1 further comprising an analog input parameter sensing means.

7. The analog input parameter sensing means of claim 6 wherein the said analog input parameter sensing means is external to the system.

8. The analog input parameter sensing means of claim 6 wherein the said analog input parameter sensing means is built-in within the system.

9. The filter of claim 1 further comprising a resistor having a first end connected to an output of a buffer, and a second end commonly connected to a capacitor and a negative input of a comparator.

10. The non-volatile memory of claim 1 wherein the non-volatile memory is $E^2$.

11. The non-volatile memory of claim 1 wherein the non-volatile memory is FeRam.

12. The non-volatile memory of claim 1 wherein the non-volatile memory is MagRam.

13. The non-volatile memory of claim 1 wherein the non-volatile memory is battery backed-up memory.

14. An integrated circuit for laser bias adjustment, comprising:
a digital-to-analog converter for receiving laser measurement signal, the digital-to-analog converter scaling laser measurement signal by a preprogrammed factor;
a filter, coupled to the digital-to-analog converter for filtering laser measurement signal to produce a filtered, scaled signal;
a comparator having a first input for receiving a target laser measurement signal associated with said received laser measurement signal and having a second input for receiving said filtered, scaled laser measurement signal, the comparator comparing the target laser measurement signal with said filtered, scaled laser measurement signal;
an output control circuit for generating an output signal based upon controlling instructions and said comparator's result;
control logic coupled to said output control circuit and coupled to said digital-to-analog converter for controlling said output control circuit and said digital-to analog converter;
an interface port connected to said control logic for communicating control data and instructions; and
non-volatile memory coupled to said control logic for storing control data and instructions.

15. The integrated circuit of claim 14, further comprising a voltage-to-current converter having an input coupled to the output control circuit and having an output for generating a control signal for laser bias adjustment, the voltage-to-current converter converting a voltage input signal to a current output signal.

16. The integrated circuit of claim 14, further comprising a first buffer, coupled between the digital-to-analog converter, and the filter, for buffering said scaled laser measurement signal.

17. The system of claim 16, further comprising a second buffer, coupled between said output control circuit and voltage-to-current converter, the second buffer buffering an output signal received from the output control circuit.

18. The integrated circuit of claim 14 further comprising a temperature sensor for measuring laser temperature.

19. An integrated circuit for motor speed adjustment, comprising:
a digital-to-analog converter for receiving a motor parameter signal, the digital-to-analog converter scaling the motor parameter signal based upon a preprogrammed factor;
a filter, coupled to the digital-to-analog converter for filtering said scaled motor parameter signal to produce filtered, scaled, motor parameter signal;
a comparator having a first input for receiving a target motor parameter signal associated with the input motor parameter signal and having a second input for receiving the filtered, scaled motor parameter signal, the comparator comparing the target motor parameter signal with the filtered, scaled motor parameter signal;
an output control circuit for generating an output signal based upon controlling instructions and said comparator's result;
control logic coupled to said output control circuit and coupled to said digital-to-analog converter for controlling said output control circuit and said digital-to-analog converter;
an interface port connected to said control logic for communicating control data and instructions; and
non-volatile memory coupled to said control logic for storing control data and instructions.

20. The integrated circuit of claim 19, further comprising a voltage driver having an input coupled to said output control circuit and an output for generating a control signal for motor parameter adjustment.

21. The integrated circuit of claim 19, further comprising a first buffer, coupled between the digital-to-analog converter and the filter, for buffering the input speed.

22. The integrated circuit of claim 21, further comprising a second buffer, coupled between the output control circuit and the voltage driver, the second buffer buffering an output signal received from the output control circuit.

23. The integrated circuit of claim 19 further comprising a speed sensor for measuring motor speed.

24. A integrated circuit for power amplifier adjustment, comprising:
    a digital-to-analog converter for receiving a power amplifier parameter signal, the digital-to-analog converter scaling the power amplifier parameter signal based upon a preprogrammed factor;
    a filter, coupled to the digital-to-analog converter for filtering the scaled power amplifier parameter signal to produce a filtered, scaled power amplifier parameter signal;
    a comparator having a first input for receiving a target power amplifier parameter signal associated with the received power amplifier parameter signal and having a second input for receiving the filtered scaled power amplifier parameter signal, the comparator comparing the target power level with the filtered signal;
    an output control circuit for generating an output signal based upon controlling instructions and said comparator's result;
    control logic coupled to said output control circuit and coupled to said digital-to-analog converter for controlling said output control circuit and said digital-to analog converter;
    an interface port connected to said control logic for communicating control data and instructions; and
    non-volatile memory coupled to said control logic for storing control data and instructions.

25. The integrated circuit of claim 24, further comprising a first buffer, coupled between the digital-to-analog converter and the filter, for buffering the input power level signal.

26. The system of claim 25, further comprising a second buffer having an input coupled to the logic circuit and an output for generating a control signal for power amplifier parameter adjustment.

27. The integrated circuit of claim 24 further comprising a sensor to detect input power level measurement.

28. The sensor of claim 27 wherein the sensor is external from the integrated circuit.

29. The sensor of claim 27 wherein the sensor is built-in within the integrated circuit.

30. A method for controlling an apparatus activity level parameter with a feedback control-loop, comprising:
    receiving an apparatus activity level parameter signal;
    scaling the apparatus activity level parameter signal;
    buffering the scaled apparatus activity level parameter signal;
    filtering the buffered, scaled apparatus activity level parameter signal;
    comparing the filtered, buffered, scaled apparatus activity level parameter signal with a target specification signal associated with the apparatus activity level parameter signal; and
    generating an output signal for control of the apparatus activity level parameter based upon preprogrammed instructions and the results of the comparing.

31. The method of claim 30 wherein the preprogrammed instructions are stored in a non-volatile memory.

32. The method of claim 30 wherein the instructions, stored in a non-volatile memory, are updated in real time.

33. A device for adjusting an activity level of one or more applications based upon sensing one analog parameter from each of the one or more applications indicative of each one or more activity levels, comprising:
    a scaling factor means for scaling the one or more analog parameters;
    a buffering means for buffering the one or more scaled analog parameters;
    a filtering means for filtering the one or more buffered, scaled analog parameters;
    a comparator means for comparing the one or more filtered, buffered, scaled analog parameters with one or more target values associated with the one or more activity levels of the one or more applications;
    a control logic means for adjusting an output control means based upon predetermined instructions regarding the one or more filtered, buffered, scaled analog parameters and the comparator results associated with the one or more target values; and
    an output control means for outputting one or more signals to one or more applications for adjusting said one or more activity levels.

34. The device of claim 33 further comprising a non-volatile memory means for storing said instructions, said scaling factors and said target values for said control logic means.

35. The device of claim 33 further comprising a means for accepting reference voltages associated with each of the said one or more activity levels and means for shifting reference voltages based upon instructions from said control logic means and means for transmitting said shifted reference voltage to said comparator means.

36. The device of claim 33 further comprising a interface input means for communicating instructions and data to said control logic means.

* * * * *